United States Patent Office 2,967,774
Patented Jan. 10, 1961

2,967,774

STABILIZATION OF OXIDIZABLE MATERIALS WITH 4,4'-ALKYLENEDIOXYBIS(ALKYLATED PHENOLS)

Alan Bell, M B Knowles, and Clarence E. Tholstrup, Kingsport, Tenn., assignors to Eastman Kodak Company, Rochester, N.Y., a corporation of New Jersey No Drawing. Filed Dec. 16, 1957, Ser. No. 702,814

13 Claims. (Cl. 99—163)

This invention relates to antioxidant compositions and to oxidizable materials stabilized therewith, and is particularly concerned with antioxidants comprising 4,4'-alkylene dioxybis(alkylated phenols). The invention also relates to compositions of matter containing one or more of such an antioxidant and to the method of incorporating such an antioxidant therewith.

A large number of materials including fats, oils, and hydrocarbons such as gasoline and the like are normally subject to the deleterious effects of oxidation upon storage.

It is known that phenolic compounds in general have antioxidant properties. However, there are a number of phenolic compounds which actually promote oxidative degradation. Moreover, most phenolic compounds have only slight antioxidant qualities and are quite inferior to certain specific phenolic compounds which have enjoyed commercial utility in recent years. The well known phenolic antioxidants available commercially include butylated hydroxyanisole, butylated hydroxytoluene, propyl gallate, N-butylated p-aminophenol, 2,2-methylenebis(4-methyl-6-tert.butylphenol), etc. In addition to the commercially available phenolic antioxidants, a great number have been suggested in various patents.

Among the prior art suggested phenolic antioxidants is 4,4'-dihydroxydiphenyl ether which has only slight antioxidant properties and is generally inferior to the commercially available antioxidants. Thus, it would be expected that related ethers would possess similarly unattractive properties.

It was therefore quite unexpected and unobvious to find that a special category of tetra-oxy phenolic compounds had great antioxidant potency. The formula for these newly discovered phenolic compounds is given below.

It is an object of this invention to provide a new and improved class of antioxidants.

It is a further object of this invention to provide compositions of matter comprising a normally oxidizable organic material stabilized with at least one member of the new and improved class of antioxidants provided by this invention.

It is a further object to provide a method for stabilizing normally oxidizable organic materials which comprises incorporating therein at least one member of the new and improved class of antioxidants provided by this invention.

Other objects will be apparent from the description and claims which follow.

According to a principal embodiment of this invention there is provided a composition of matter comprising a normally oxidizable organic material stabilized with a phenolic compound having the following formula:

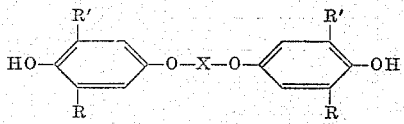

wherein each of R and R' represents a member selected from the group consisting of a hydrogen atom and an alkyl-organic radical containing from 1 to 12 carbon atoms, said alkyl-organic radical encompassing members selected from the group consisting of alkyl, cycloalkyl, alkenyl, and aralkyl radicals and X represents an alkylene radical containing from 1 to 10 carbon atoms.

According to a preferred embodiment of this invention R does not represent a hydrogen atom. In other words, R represents an alkyl organic radical containing from 1 to 10 carbon atoms. Most advantageously, R represents a tertiary alkyl radical.

R' can be the same as R or it can be a different alkyl-organic radical or a hydrogen atom. Each of the four substituents represented by R and R' can be different although it is generally advantageous if the two R substituents are identical and the two R' substituents be the same as the two R substituents or that they represent hydrogen atoms.

The phenolic compounds provided by this invention can be used for stabilizing any of the materials which are normally subject to oxidation. However, as is usually the case with antioxidants, they are far more potent in some materials than in others. Thus, antioxidants of this invention contribute their highest order of potency in the stabilization of hydrocarbons such as paraffin wax, petroleum oils including gasoline and other motor fuels, polyethylene, polypropylene and other normally solid polymers of alpha-monoolefins containing from 2 to 7 carbon atoms, petroleum derivatives of various types such as lubricating oils, transformer oils, etc.

In addition the antioxidants of this invention can be used in stabilizing polymeric compositions such as polyesters including the linear polyesters and alkyd resins, synthetic rubber compositions, natural rubber compositions, insecticide compositions, medicinal preparations, etc. Moreover, antioxidants of this invention can be used for stabilizing fatty triglycerides such as lard, vegetable oils, animal fats, fish oils, etc. The antioxidants of this invention are particularly valuable in the stabilization of fatty oils or other compositions containing vitamin A.

Specific materials which can be stabilized with antioxidants of this invention include margarine, cottonseed oil, corn oil, peanut oil, free fatty acids such as oleic acid and similar readily oxidizable acids, cracked gasoline, polyacrylonitrile, polyethyleneterephthalate, polypropylene, paraffin wax, straight run gasoline, leaded gasoline, citrus oils, various essential oils, greases, cellulose esters, tallow, fatty acid monoglycerides and diglycerides, etc.

The amount of antioxidant which can be employed in practicing this invention can be varied depending upon the material being stabilized, the degree of stabilization desired, the presence or absence of other stabilizing materials and similar varying features. In most cases the stabilizers can be advantageously employed in concentrations of from about 0.01% to about 2% by weight based on the total weight of the composition being stabilized. However, the antioxidants of this invention can also be employed in amounts of from about 0.001% to about 5% by weight. Moreover, larger or smaller quantities can also be employed. In addition, the antioxidants of this invention can be employed in conjunction with other antioxidants known to be useful for the stabilization of compositions normally subject to oxidative deterioration. When required, metal deactivators and other additives can be included. Thus, the antioxidant or stabilizer compounds provided by this invention can be used in conjunction with other compounds such as butylated hydroxytoluene, butylated hydroxyanisole, propyl gallate, citric acid, N,N'-disec.butyl-p-phenylenediamine, disalicyclalpropylenediimine, 5-acenaphthenol, 2,4,5-trihydroxybutyrophenone, octadecyl gallate, 2-tert.butyl-4- dodecoxyphenol, tocopherol, phosphoric acid, lecithin, etc.

The antioxidants of this invention or combinations thereof with other antioxidants or synergistic compounds can be advantageously employed as added components used in the preparation of edible materials such as cooking oils and fried food prepared using such cooking oils. Similarly such antioxidant compositions can be used in preparing wrappers for foods and other materials subject to oxidative deterioration. Moreover, antioxidant compositions incorporating the compounds of this invention can be incorporated into coating materials such as paraffin wax or hydrocarbon oils used for the preparation of waxed paper and other wrapping materials whereby foods contained therein are protected against oxidative deterioration.

It is believed that the phenolic compounds used as antioxidants or stabilizers in accordance with this invention have not been described previously in the prior art. However, the preparation of compounds which are somewhat related has been known and the techniques familiar to organic chemists have been employed in adapting such known procedures to the preparation of the compounds of this invention. Thus, Kohn and Wilhelm published a procedure in Monatsh., 43, 545 (1923), on the preparation of 4,4'-ethylenedioxy-bisphenols which is similar to that used in the preparation of the compounds of the present invention.

The preparation of typical compounds embodying this invention is illustrated by the following examples. Other compounds which come within the scope of the invention can be prepared in a similar manner, and it is not intended that the invention should be limited to these specific compounds set forth in the following examples which are provided for purposes of illustration.

EXAMPLE 1

*Preparation of 4,4'-ethylenedioxybis(2-tert-butylphenol)*

A mixture of 80 g. (0.48 mole) of tert-butylhydroquinone, 24 g. (0.13 mole) of 1,2-dibromoethane, and 10 g. of water was charged to a flask fitted with a stirrer, reflux condenser, dropping funnel, and gas inlet tube. A slow stream of nitrogen was used to maintain an inert atmosphere. The mixture was brought to a gentle reflux and 20 g. (0.35 mole) of potassium hydroxide in 20 ml. of water was then added dropwise. Refluxing was continued for 1½ hours.

The reaction mixture was cooled and was then acidified with hydrochloric acid. A sticky ball formed which was crystallized twice from acetic acid-water and then twice from benzene. A yield of 8.4%, which melted at 155-6° C., was obtained.

EXAMPLE 2

*Preparation of 4,4'-tetramethylenedioxybis(2-tert-bultyl-methylbutyl)phenol]*

A mixture of 44 g. (0.2 mole) of 2-(1,1,3,3-tetramethylbutyl)hydroquinone (tert-octylhydroquinone), 19 g. (0.1 mole) of 1,2-dibromoethane, 0.2 g. of zinc dust, and 75 ml. of ethanol was gently refluxed under a nitrogen atmosphere. A solution of 13 g. (0.2 mole) of potassium hydroxide in 95 ml. of 75% ethanol was added dropwise. After refluxing for ½ hour the mixture was cooled and then filtered to remove zinc and potassium bromide.

Dilution with water caused a sticky, crystalline material to separate. Two recrystallizations from acetic acid-water and one from methanol-water gave a white crystalline material which melted at 125–128° C. The yield was 3.5 g. (4%).

EXAMPLE 3

*Preparation of 4,4'-tetramethylenedioxybis(2-tertbutylphenol)*

This compound was prepared in a fashion similar to that of Example 2 starting with 33 g. (0.2 mole) of tert-butylhydroquinone, 21.6 g. (0.1 mole) of 1,4-dibromobutane, and 13 g. (0.2 mole) of potassium hydroxide. The white crystalline product, crystallized from benzene-hexane, melted at 143–148° C. A yield of 6.5 g. (17%) was obtained.

EXAMPLE 4

*Preparation of 4,4'-decamethylenedioxybis(2-tert-butylphenol)*

This compound was prepared by the procedure used in Example 2 starting with 23 g. (0.14 mole) of tert-butylhydroquinone, 9.2 g. (0.14 mole) of potassium hydroxide, and 21 g. (0.07 mole) of 1,10-dibromodecane. The product was crystallized from acetic acid-water then twice from naphtha. A yield of 2 g. (6%), which melted at 132–137° C., was obtained.

As mentioned above, other compounds coming within the scope of the general formula set forth above can be prepared in a manner similar to that illustrated by the preceding specific examples. Some of these additional compounds are named in the tables provided hereinbelow. Many others will be readily apparent including compounds such as 4,4'-ethylenedioxybis(2,6-ditert.butylphenol), 4,4' - tetramethylenedioxybis(2,6 - ditert.octylphenol), etc. Other compounds which are not symmetrical are also included such as where one R is a tert.octyl radical and the other three R and R' substituents represent hydrogen atoms. The R and R' radicals can represent cycloalkyl and aralkyl radicals as illustrated by 4,4'-ethylenedioxybis(2 - cyclohexylphenol), 4,4' - tetramethylenedioxybis(2-benzylphenol), etc.

Examples illustrating the effectiveness of the antioxidants of this invention are set forth in the following tables. The antioxidants can be incorporated into the material to be stabilized by any suitable means including simply mixing the constituents. Another method comprises dissolving the antioxidant in a solvent which is miscible with the material to be stabilized and then mixing the solution of the antioxidant with the material to be stabilized. If the material to be stabilized is a solid such as polyethylene, it may be advantageous to knead the antioxidant into the polyethylene on heated rolls until a uniform blend is achieved. Various other methods for incorporating the antioxidant into the materials to be stabilized will be readily apparent.

The potency of the phenolic compounds of this invention as highly effective stabilizers for paraffin wax is illustrated by the following table wherein 0.01% of the antioxidant compound is incorporated into paraffin wax and data is presented using the active oxygen method conducted at 150° C. The results according to the active oxygen method (AOM) are shown in terms of the number of hours required to produce a peroxide value of 20, 70 and 100. For purposes of comparison data is also shown for one of the commercially available antioxidants, namely BHA which is a mixture of isomers of tert.butyl-4-methoxyphenol.

TABLE I

*AOM stability in hours of paraffin wax at 150° C. to produce designated peroxide values*

| Additive (each at 0.01% by weight) | Hours (AOM) for each Peroxide Value (P.V.) | | |
| --- | --- | --- | --- |
| | P.V. 20 | P.V. 70 | P.V. 100 |
| Control (no additive) | 6 | 7 | 8 |
| BHA | 18 | 19 | 20 |
| 4,4'-Ethylenedioxybis(2-t-butylphenol) | 39 | 40 | 41 |
| 4,4'-Ethylenedioxybis(2-t-octylphenol) | 40 | 41 | 42 |
| 4,4'-Tetramethylenedioxybis(2-t-butylphenol) | 41 | 42 | 43 |
| 4,4'-Decamethylenedioxybis(2-t-butylphenol) | 47 | 48 | 49 |
| 4,4'-(3-Methylhexamethylene)dioxybis(2-t-butylphenol) | 45 | 46 | 47 |
| 4,4'-(2-Ethyltrimethylene)dioxybis(2-t-butylphenol) | 42 | 43 | 44 |
| 4,4'-(2-Isobutyltetramethylene)dioxybis(2-t-butylphenol) | 43 | 44 | 45 |

The potency of the phenolic compounds of this invention as excellent stabilizers for polyethylene is illustrated by Table 2 which presents data using an oven storage test. This test is described in other patent applications and briefly stated it involves the storage of samples of polyethylene in a heated forced air oven. Periodic tests are run on the samples in the oven to determine whether there has been any peroxide build up. The presence of peroxide is measured by iodiometry tests. The oven storage test was conducted at 140° C. and also 160° C. The number of hours required to produce a detectable concentration of peroxides is shown in the table. Where this detectable concentration of peroxides was not built up by the time the last sample was tested, the data in the table shows the number of hours during which the sample was tested with the indication that the actual number of hours would be greated than that. Thus, it does not necessarily follow that a figure on the table shown as greater than 170 would be higher in actuality than another figure shown in the table as greater than 162.

TABLE 2

*Oven life in hours of polyethylene before peroxides were observed*

| Additive | Weight Percent | Oven Life, 140° C. | (Hrs.) at 160° C. |
|---|---|---|---|
| Control (no additive) | 0 | 14 | 5 |
| BHA | 1.0 | 14 | 2 |
| 4,4'-Ethylenedioxybis(2-t-butylphenol) | 1.0 | >234 | 100 |
|  | 0.1 | >162 | 39 |
| 4,4'-Ethylenedioxybis(2-t-octylphenol) | 1.0 | >234 | 140 |
|  | 0.1 | >162 | 57 |
| 4,4'-Tetramethylenedioxybis(2-t-butylphenol) | 1.0 | >234 | 140 |
| 4,4'-Decamethylenedioxybis(2-t-butylphenol) | 1.0 | >234 | 100 |
|  | 0.1 | >162 | 57 |
| 4,4'-(2-Methylhexamethylene)dioxybis(2-t-butylphenol) | 1.0 | >220 |  |
|  | 0.1 | >170 | 60 |
| 4,4'-(2-Ethyltrimethylene)dioxybis(2-t-butylphenol) | 1.0 | >220 |  |
|  | 0.1 | >170 | 60 |
| 4,4'-(2-Isobutyltetramethylene)dioxybis(2-t-butylphenol) | 1.0 | >220 |  |
|  | 0.1 | >170 | 61 |

The data provided in Table 2 based upon tests using one of the commercially available polyethylene plastics. Similar results can be obtained using other commercial grades of polyethylene which are now available and can be purchased on the open market. The details of the oven stability test for polyethylene are set forth in copending application Serial No. 685,063, filed September 20, 1957, by Bell and Tholstrup.

The stabilization of other poly-alpha-monoolefins can be accomplished using the antioxidants of this invention as illustrated by the following data relating to the stabilization of polypropylene.

TABLE 3

*Oven life in hours of polypropylene before peroxides were observed*

| Additive | Weight Percent | Oven Life (Hrs.) at 140° C. |
|---|---|---|
| Control | 0 | 0.5 |
| 4,4'-Ethylenedioxybis(2-tert.-butylphenol) | 0.5 | 15.0 |
| 4,4'-Ethylenedioxybis(2-tert.-butylphenol) | 1.0 | 70.0 |

Although the phenolic compounds of this invention are most advantageously effective in hydrocarbons such as paraffin wax, polyethylene, polypropylene, gasoline, petroleum oils, rubber, and the like, they can also be used quite effectively in stabilizing other organic materials normally subject to oxidative deterioration as illustrated by the following table which shows that phenolic antioxidants of this invention are effective for stabilizing lard.

TABLE 4

*AOM stability in hours of lard at 98.8° C. to produce a peroxide value of 20*

| Additive (each at 0.02% by weight) | Hours (AOM) |
|---|---|
| Control (no additive) | 12.0 |
| BHA | 31.0 |
| 4,4'-Ethylenedioxybis(2-t-butylphenol) | 33.0 |
| 4,4'-Ethylenedioxybis(2-t-octylphenol) | 34.0 |
| 4,4'-Tetramethylenedioxybis(2-t-butylphenol) | 34.0 |
| 4,4'-Decamethylenedioxybis(2-t-butylphenol) | 39.0 |
| 4,4'-(3-Methylhexamethylene)dioxybis(2-t-butylphenol) | 37.0 |
| 4,4'-(2-Ethyltrimethylene)dioxybis(2-t-butylphenol) | 36.0 |
| 4,4'-(2-Isobutyltetramethylene)dioxybis(2-t-butylphenol) | 35.0 |

The antioxidants provided by this invention are also quite effective for vitamin stabilization. For example, the compounds of this invention were evaluated for stabilizers for vitamin A in Pollock liver oil and the data obtained is presented in Table 5.

TABLE 5

*Loss of activity of vitamin A in Pollock liver oil by bead-test method*

| Additive | Weight Percent | Days Until 50% Loss of Activity |
|---|---|---|
| Control | 0 | 2 |
| 4,4'-ethylenedioxybis(2-tert.-butylphenol) | 0.02 | 13 |
| 4,4'-decamethylenedioxybis(2-tert.butylphenol) | 0.02 | 14 |

The procedure used in determining the above data involves adding the designated percentage of the antioxidant to a petroleum ether solution of Pollock liver oil so as to have present in the solution the appropriate amount of antioxidant based on the weight of the Pollock liver oil. Aliquots of the stabilized petroleum ether solution were pipetted into a series of 50 ml. beakers containing a single layer of 4 mm. glass beads. The petroleum ether was then allowed to evaporate at room temperature in the dark. The beakers were stored at 100° F. The vitamin A content of the Pollock liver oil in the beakers was determined at suitable intervals by the Carr-Price method until a 50% loss of original vitamin A activity resulted. It can be seen from the data presented in Table 5 that the antioxidants of this invention are quite effective in the stabilization of the vitamin A content of fish liver oils.

The preceding examples set forth in the various tables illustrate that the phenolic compounds of this invention are suitable for the stabilization of any of the organic materials normally subject to oxidative deterioration. Data such as that presented above can be obtained regarding any of the fatty triglycerides, diglycerides or monoglycerides using the AOM procedure commonly employed in the art whereby air is bubbled through a sample of the stabilized composition and the time necessary for the sample to reach a given peroxide content is measured. Illustrative data provided in Table 4 based upon a peroxide value of 20 is a commonly accepted value when lard is being tested.

Although the data provided above illustrates some of the valuable attributes of this invention, the phenolic compounds possess further qualities. Thus, another object of this invention is to provide phenolic antioxidant compounds which are highly effective under adverse temperature conditions such as used in paper coating, injection molding, extrusion of polyester, polyolefin, polyamide or other polymeric synthetic fibers or films, cooking of foods as in frying potato chips, etc., whereby the antioxidant properties exhibit superior carry-through properties into the heat-processed product. A further object of this invention is to provide antioxidants which normally have low volatility and high chemical stability and retain these properties even at high temperatures where

We claim:
1. A composition of matter comprising a normally oxidizable organic material stabilized with a phenolic compound having the following formula:

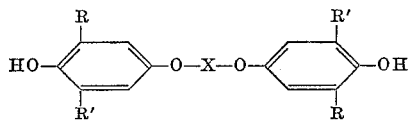

wherein each R represents an alkyl organic radical containing from 1 to 10 carbon atoms and each R' represents a member selected from the group consisting of a hydrogen atom and an alkyl-organic radical containing from 1 to 12 carbon atoms, said alkyl-organic radicals being selected from the group consisting of alkyl, cycloalkyl, alkenyl, and aralkyl radicals and X represents an alkylene radical containing from 1 to 10 carbon atoms.

2. A composition as defined by claim 1 wherein the phenolic compound is 4,4'-ethylenedioxybis(2-tert.butylphenol).

3. A composition as defined by claim 1 wherein the phenolic compound is 4,4'-ethylenedioxybis(2-[1,1,3,3-tetramethylbutyl]phenol).

4. A composition as defined by claim 1 wherein the phenolic compound is 4,4'-tetramethylenedioxybis(2-tert.butylphenol).

5. A composition as defined by claim 1 wherein the phenolic compound is 4,4'-decamethylenedioxybis(2-tert.butylphenol).

6. A composition as defined by claim 1 wherein the phenolic compound is 4,4'-(2-isobutyltetramethylene)dioxybis(2-tert.butylphenol).

7. A composition as defined by claim 1 wherein the normally oxidizable organic material is a fatty triglyceride.

8. A composition as defined by claim 1 wherein the normally oxidizable organic material is lard.

9. A composition as defined by claim 1 wherein the normally oxidizable organic material is a hydrocarbon.

10. A composition as defined by claim 1 wherein the normally oxidizable organic material is paraffin wax.

11. A composition as defined by claim 1 wherein the normally oxidizable organic material is a normally solid polymer of an α-mono-olefin containing from 2 to 7 carbon atoms.

12. A composition as defined by claim 7 wherein vitamin A is present and is stabilized.

13. A method for stabilizing normally oxidizable organic materials which comprises incorporating therein from about 0.001% to about 5% by weight thereof of a phenolic compound having the following formula:

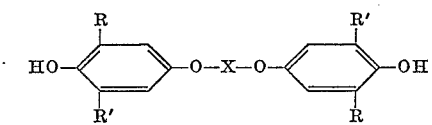

wherein each R represents an alkyl organic radical containing from 1 to 10 carbon atoms and each R' represents a member selected from the group consisting of a hydrogen atom and an alkyl-organic radical containing from 1 to 12 carbon atoms, said alkyl-organic radicals being selected from the group consisting of alkyl, cycloalkyl, alkenyl, and aralkyl radicals and X represents an alkylene radical containing from 1 to 10 carbon atoms.

References Cited in the file of this patent

UNITED STATES PATENTS

| | | |
|---|---|---|
| 2,739,171 | Linn | Mar. 20, 1956 |
| 2,838,511 | Filbey | June 10, 1958 |
| 2,850,534 | Gleim | Sept. 2, 1958 |